United States Patent
Lee et al.

(10) Patent No.: US 7,321,406 B2
(45) Date of Patent: Jan. 22, 2008

(54) LIQUID CRYSTAL DISPLAY DEVICE AND METHOD OF FABRICATING THE SAME

(75) Inventors: Jong-Hwae Lee, Seoul (KR); Jong-Hoon Woo, Gyeonggido (KR)

(73) Assignee: LG. Philips LCD. Co., Ltd., Seoul (KR)

( * ) Notice: Subject to any disclaimer, the term of this patent is extended or adjusted under 35 U.S.C. 154(b) by 423 days.

(21) Appl. No.: 11/153,088

(22) Filed: Jun. 14, 2005

(65) Prior Publication Data
US 2006/0028603 A1    Feb. 9, 2006

(30) Foreign Application Priority Data
Aug. 9, 2004    (KR) .................. 10-2004-0062382

(51) Int. Cl.
*G02F 1/1333* (2006.01)
(52) U.S. Cl. .................................................. 349/110
(58) Field of Classification Search ........ 349/110–111, 349/48
See application file for complete search history.

(56) References Cited

U.S. PATENT DOCUMENTS

| | | | | |
|---|---|---|---|---|
| 5,432,527 A | * | 7/1995 | Yanai et al. | 345/92 |
| 5,844,646 A | * | 12/1998 | Yanai | 349/110 |
| 5,861,928 A | * | 1/1999 | Sekiguchi | 349/49 |
| 6,885,417 B2 | * | 4/2005 | Murade | 349/111 |
| 7,084,942 B2 | * | 8/2006 | Luo | 349/114 |

* cited by examiner

*Primary Examiner*—James A. Dudek
(74) *Attorney, Agent, or Firm*—Brinks Hofer Gilson & Lione (57) ABSTRACT

A liquid crystal display device includes: a plurality of gate lines and a plurality of data lines crossing the plurality of gate lines that define the plurality of pixel regions that define a plurality of pixel regions on a first substrate; a plurality of thin film transistors each residing in a pixel region, wherein the plurality of thin film transistors are symmetrically formed with respect to a central gate line and wherein paired transistors reside on opposite sides of the central gate line; and a black matrix including a first portion overlying the central gate line and the paired transistors, a second portion overlying the plurality of thin film transistors, and an additional part that is integral with the second portion and renders the black matrix symmetrical with respect to the first portion.

21 Claims, 14 Drawing Sheets

FIG. 1

*(related art)*

FIG. 2

*(related art)*

FIG. 3

*(related art)*

LIQUID CRYSTAL DISPLAY DEVICE AND METHOD OF FABRICATING THE SAME

This application claims the benefit of Korean Patent Application No. 2004-62382, filed on Aug. 9, 2004, which is hereby incorporated by reference.

BACKGROUND

1. Technical Field

The present invention relates to a liquid crystal display (LCD) device, and more particularly, to an LCD device and a method of fabricating the LCD device.

2. Description of the Related Art

Presently, LCD devices are being developed as the next generation of display devices because of their light weight, thin profile, and low power consumption. In general, an LCD device is a non-emissive display device that displays images using a refractive index difference utilizing optical anisotropy properties of a liquid crystal material that is interposed between an array (TFT) substrate and a color filter substrate. Among the various type of LCD devices commonly used, active matrix LCD (AM-LCD) devices have been developed because of their high resolution and superiority in displaying moving images. The AM-LCD device includes a thin film transistor (TFT) in each pixel region as a switching device, a pixel electrode in each pixel region, and a second electrode used for a common electrode.

Figure 1:
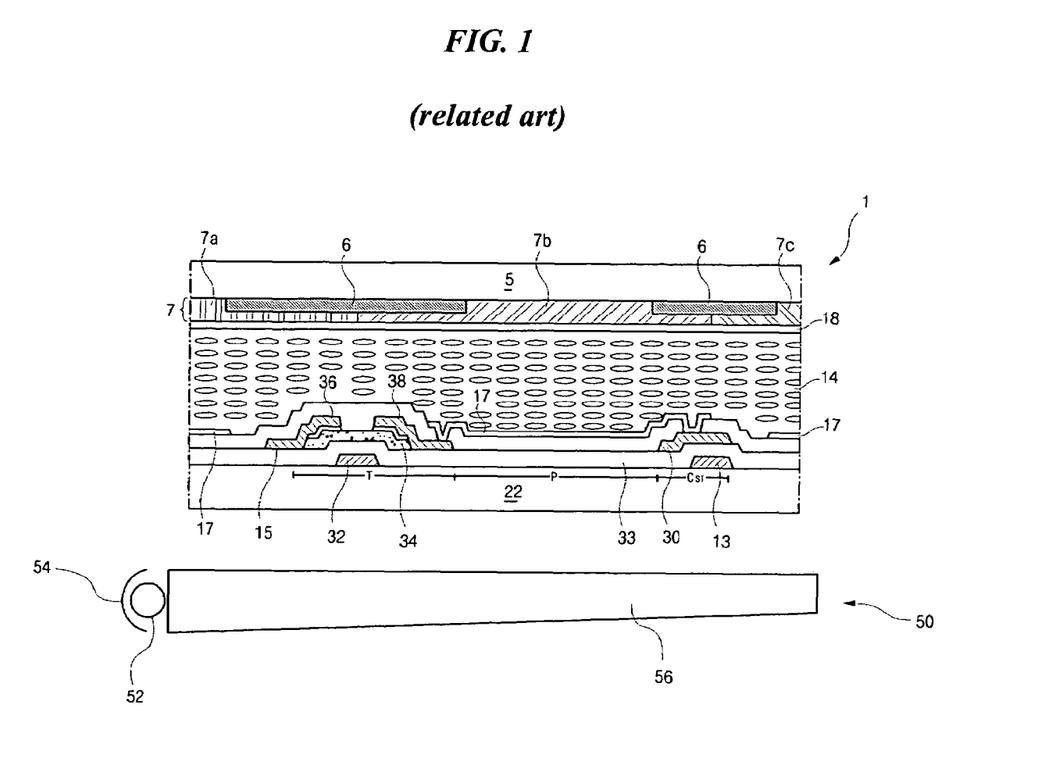
FIG. 1 is a schematic cross sectional view of an LCD device according to the related art.

FIG. 1 is a schematic cross sectional view of an LCD device according to the related art. In FIG. 1, an LCD panel 1 includes upper and lower substrates 5 and 22 arranged to face each other with a liquid crystal layer 14 interposed therebetween. A color filter layer 7 and a common electrode 18 overlie an inner surface of the upper substrate 5, in which the common electrode 18 functions as an electrode for applying an electric field to the liquid crystal layer 14. The color filter layer 7 includes red, green and blue color filters 7a, 7b and 7c for passing only a specific wavelength of light, and a black matrix 6 that is disposed at the boundary between the red, green and blue color filters 7a, 7b and 7c and shields light from a region in which alignment of the liquid crystal layer 14 is uncontrollable. On an inner surface of the lower substrate 22, a gate line 13 and a data line 15 cross the gate line 13 to define a pixel region P. A TFT T, which functions as a switching device, is disposed at crossing of the gate line 13 and the data line 15. The TFT T includes a gate electrode 32 connected to the gate line 13, a semiconductor layer 34 over the gate electrode 32, a source electrode 36 connected to the data line 15, and a drain electrode 38 spaced apart from the source electrode 36. A pixel electrode 17 is connected to the TFT T. For example, the pixel electrode 17 is made of a transparent conductive material such as indium tin oxide (ITO).

A portion of the gate line 13 is utilized for a first capacitor electrode (not shown). A second capacitor electrode 30 is formed with the same material as the data line 15. The first capacitor electrode, the second capacitor electrode 30 and a gate insulating layer 33 interposed therebetween constitute a storage capacitor $C_{ST}$. Here, the second capacitor electrode 30 is connected to the pixel electrode 17 to be applied to a signal of the pixel electrode 17.

A structure of the storage capacitor $C_{ST}$ may be variously modified.

In addition, a backlight unit 50 is disposed under the LCD panel 1. The backlight unit 50 includes a cold cathode fluorescent lamp 52 as a fluorescent lamp, a lamp housing 54 covering the cold cathode fluorescent lamp 52, a light guide panel 56 that converts light from the cold cathode fluorescent lamp 52 into a plan light, a reflector (not shown) under the light guide panel 56 to reflect light toward the LCD panel 1, a diffusion sheet (not shown) diffusing light from the light guide panel 56, first and second prism sheets (not shown) controlling a direction of the light for the first diffusion sheet, a protection sheet (not shown) protecting the sheets therebelow.

However, the LCD panel 1 is increasingly being manufactured as a light-weight, slimly-shaped, model, for example, such that a light emitting diode is suggested instead of the cold cathode fluorescent lamp 52 as the light source of the backlight unit 50.

The light emitting diode can emit red, green and blue colors and can be manufactured as a small, slim and a light-weight device.

In addition, a field sequential color (FSC) driving method is suggested to obtain a high image quality with respect to an LCD device using a backlight unit having the mentioned light emitting diode emitting the red, green and blue colors. This FSC driving method may be defined such that red, green and blue colors are sequentially embodied and mixed with a time interval among the red, green and blue colors, thereby improving brightness in comparison with the related art driving method. Actually, in the FSC driving method, inputting data and the response speed of the liquid crystal material should be faster than the driving method according to the related art, which will increase brightness. However, there is a limitation to increasing brightness because the on-time of the backlight unit, except for inputting data and response time of the liquid crystal material, is limited.

To overcome these limitations, a tiling driving method, which is defined such that the LCD panel is independently driven in accordance with partitioned portions, is suggested.

Figure 2:
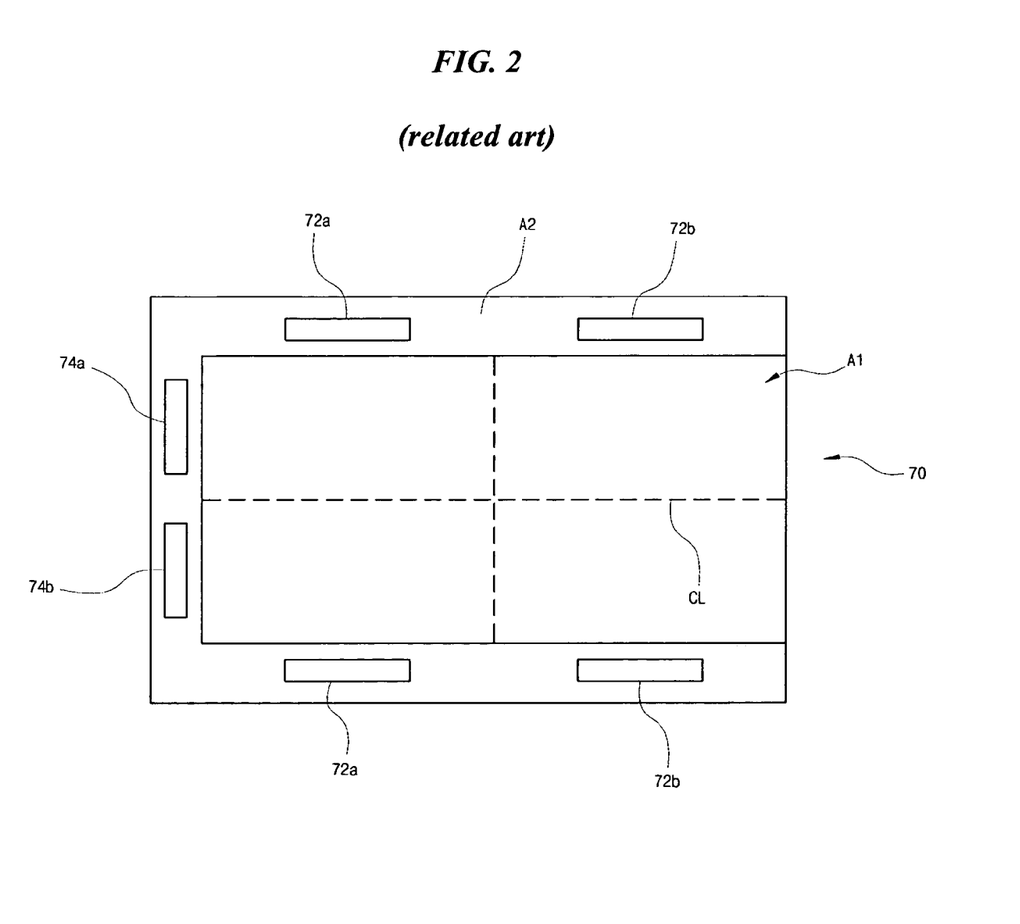
FIG. 2 is a schematic plan view of an LCD device applied a tiling driving method according to the related art.

FIG. 2 is a schematic plan view of an LCD device applying a tiling driving method according to the related art.

As shown in FIG. 2, an LCD device 70 includes an active area A1 displaying a picture and a driving area A2 in a periphery with the active area A1. The LCD device 70 is partitioned top, bottom, right and left portions with respect to central line CL. Accordingly, as first and second source integrated circuit boards 72a and 72b are disposed in both the top and bottom portions and first and second gate integrated circuit boards 74a and 74b are disposed in the left portion, they are independently driven by the partitioned portions.

More specifically, the first and second gate integrated circuit boards 74a and 74b in the top and bottom portions with respect to the central gate line (not shown) are independently driven and scanning of the gate lines is begun from the central gate line. Here, top and bottom pixels of the central gate line are sequentially driven simultaneously.

As explained above, when the LCD panel is independently driven by the partitioned portions the inputting time of the data is reduced. Therefore, the response time and on-time of the backlight unit have an enough margin due to the reduction of inputting time.

Consequently, the LCD device applying the FSC driving method using partitioned driving can obtain high brightness.

Figure 3:
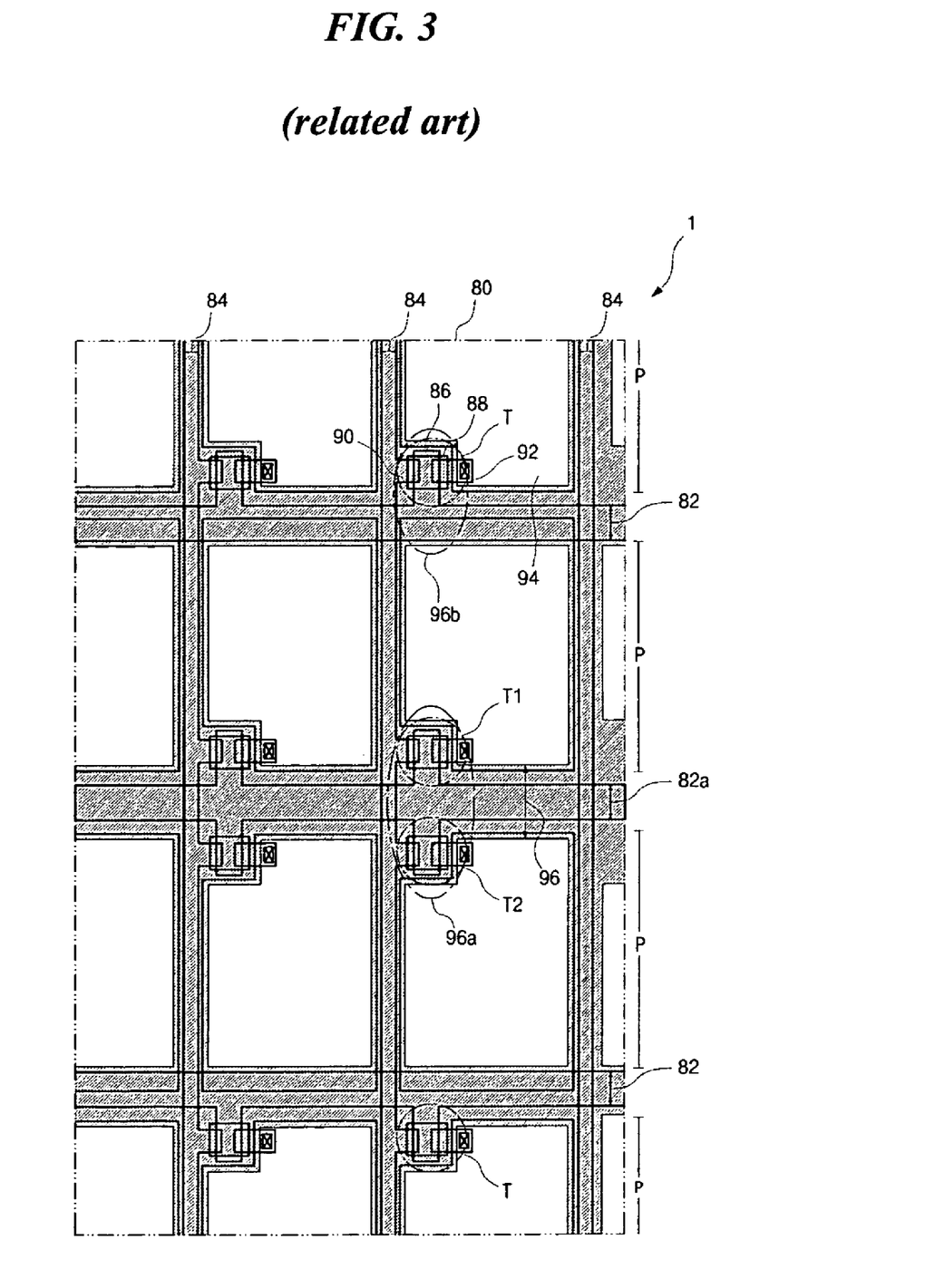
FIG. 3 is an expanded plan view of a substrate of a FSC type LCD device applied a tiling driving method according to the related art.

FIG. 3 is an expanded plan view of a substrate of a FSC type LCD device applied a tiling driving method according to the related art.

As shown in FIG. 3, a plurality of gate lines 82 and 82a and a plurality of data lines 84 cross the plurality of gate lines 82 and define a plurality of pixel regions P on a substrate 80. For example, the substrate 80 is made of a transparent insulating material. A plurality of thin film transistors T, T1 and T2 are formed at crossing points of the plurality of gate lines 82 and 82a and the plurality of data lines 84 and are symmetrically formed with respect to a central gate line 82a of the plurality of gate lines 82 and 82a. Each of the plurality of thin film transistors T, T1, T2 includes a gate electrode 86, a semiconductor layer 88, a source electrode 90 and a drain electrode 92.

Here, the first and second thin film transistors T1 and T2 of the plurality of thin film transistors T, T1 and T2 are connected to the central gate line 82a.

Each of a plurality of pixel electrodes 94 is connected to the each of the plurality of the drain electrodes 92. In other words, the first and second thin film transistors T1 and T2 adjacent to the central gate line 82a are all connected to the central gate line 82a. Therefore, the first and second thin film transistors T1 and T2 are simultaneously driven using the central gate line 82a. Simultaneously, scanning signals are sequentially applied to top and bottom portions of the LCD panel 1 with respect to the central gate line 82a.

A black matrix 96 is formed over the plurality of thin film transistors T, T1 and T2 to correspond to the plurality of gate lines 82, 82a, the plurality of data lines 84 and the plurality of thin film transistors T, T1 and T2. The black matrix 96 is formed to prevent leakage current by shielding the plurality of thin film transistors from irradiation of the incident light. In addition, the black matrix 96 is formed to prevent a light leakage from the backlight unit by shielding an interval space between the plurality of pixel electrodes 94 and the plurality of gate and data lines 82, 82a and 84.

That is, the black matrix 96 includes a first portion 96a corresponding to the first and second thin film transistors T1 and T2 and a second portion 96b corresponding to one of the plurality of thin film transistors except the first and second thin film transistors T1 and T2. In other words, the black matrix 96 has different sizes corresponding to the plurality of thin film transistors T, T1 and T2 with respect to the central gate line 82a such that the first portion 96a is bigger than the second portion 96b. Since the black matrix 96 has different portions between a portion of the central gate line 82a and a portion of the other gate lines 82 except the central gate line 82, it occurs as an image quality defect, such as a moiré phenomenon, and an image quality problem in that the central gate line 82a is prominently shown. More specifically, the moiré phenomenon may be defined as an interference pattern, such as a ripple pattern, having a bigger period than an origin size when at least one pattern having a period in a space view.

Consequently, the moiré phenomenon of the interference pattern adjacent to the central gate line 82a due to a size difference between the first and second portions 96a and 96b of the black matrix 96 may occur, thereby reducing the image quality of the display.

BREIF SUMMARY

Accordingly, the present invention is directed to an LCD device and a method of fabricating the LCD device that substantially obviates one or more of the problems due to limitations and disadvantages of the related art.

An object of the present invention is to provide an LCD device having a high image quality by preventing a moiré phenomenon and a problem such that the central gate line is prominently shown when an image of the LCD device is displayed.

Another object of the present invention is to provide a method of fabricating an LCD device having a high image quality by preventing a moiré phenomenon and a problem such that the central gate line is prominently shown when an image of the LCD device is displayed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: a plurality of gate lines and a plurality of data lines crossing the plurality of gate lines to define a plurality of pixel regions on a first substrate; a plurality of thin film transistors at crossing points of the plurality of gate lines and the plurality of data lines, wherein the plurality of thin film transistors are symmetrically formed with respect to a central gate line of the plurality of gate lines, and wherein two groups of the plurality of thin film transistors are adjacent to the central gate line and are connected to the central gate line; a plurality of pixel electrodes connected to the plurality of thin film transistors, each of the plurality of pixel electrodes residing in each of the pixel regions; and a black matrix including a first portion overlapping the plurality of gate lines and the plurality of data lines, a second portion overlapping the plurality of thin film transistors, and a part that is integral with the first portion and renders the black matrix symmetrical with respect to the central gate line.

In another aspect, a method of fabricating a liquid crystal display device includes: forming a plurality of gate lines having a plurality of gate electrodes on a first substrate, wherein the first substrate has a plurality of pixel regions, wherein each of the plurality of gate electrodes are formed in each of the plurality of pixel regions, wherein two groups of the plurality of gate electrodes are adjacent to and directly connected to the central gate line; forming a plurality of data lines crossing the plurality of gate lines; forming a plurality of source electrodes connected to the plurality of data lines and a plurality of drain electrodes spaced apart from the plurality of source electrodes, wherein each of the plurality of gate electrodes, the plurality of source electrodes and the plurality of drain electrodes constitutes one of a plurality of thin film transistors, and wherein two groups of the plurality of thin film transistors adjacent to the central gate line are connected to the central gate line; forming a plurality of pixel electrodes connected to the plurality of thin film transistors, each of the plurality of pixel electrodes connected to the each of the plurality of drain electrodes; and forming a black matrix including a first portion overlapping the plurality of gate lines and the plurality of data lines and a first portion corresponding the plurality of thin film transistors, wherein a part is integral with the first portion and renders the black matrix symmetrical with respect to with respect to the central gate line.

In yet another aspect, a liquid crystal display device includes: a plurality of gate lines and a plurality of data lines crossing the plurality of gate lines that define the plurality of pixel regions that define a plurality of pixel regions on a first substrate; a plurality of thin film transistors each residing in a pixel region, wherein the plurality of thin film transistors are symmetrically formed with respect to a central gate line and wherein paired transistors reside on opposite sides of the central gate line; and a black matrix including a first portion overlying the central gate line and the paired transistors, a second portion overlying the plurality of thin film transistors, and an additional part that is integral with the second portion and renders the black matrix symmetrical with respect to the first portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or the like parts.

Figure 4:
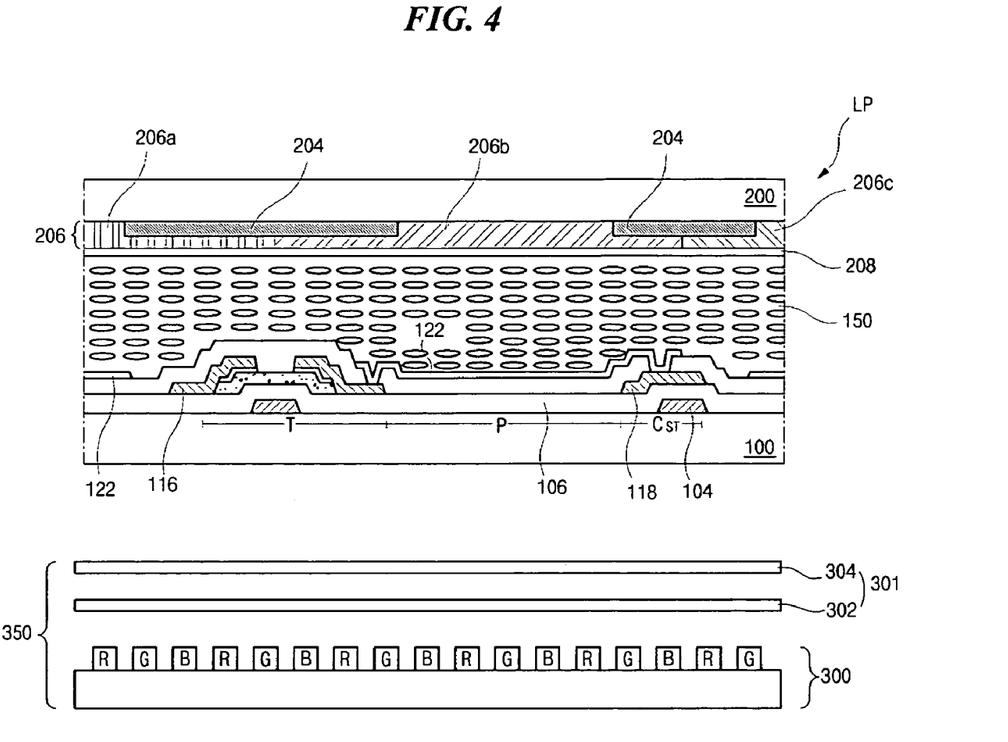
FIG. 4 is a schematic cross sectional view of a FSC type LCD device applied a tiling driving method according to the present invention.

FIG. 4 is a schematic cross sectional view of a FSC type LCD device applying a tiling driving method according to the present invention.

In FIG. 4, an LCD panel LP includes a first substrate 100, a second substrate 200 facing the first substrate 100, and a liquid crystal layer 150 interposed therebetween. A backlight unit 350 is disposed under the LCD panel LP. A gate line 104 is formed on an inner surface of the first substrate 100, a data line 116 crosses the gate line 104 to define a pixel region P. A thin film transistor T is connected to the gate line 104 and to the data line 116 at crossing point thereof, and a pixel electrode 122 is connected to the thin film transistor T in the pixel region P. In addition, a first capacitor electrode (not shown) resides in a portion of the gate line 104, and a second capacitor electrode 118, formed of the same material as the data line 116, and a gate insulating layer 106 constitute a storage capacitor $C_{ST}$.

A black matrix 204 is formed on an inner surface of the second substrate 200 and corresponds to the gate line 104, the data line 116, and the thin film transistor T except the pixel region P. A color filter layer 206 is formed on the inner surface of the second substrate 200, more specifically, the color filter layer 206 includes red, green and blue color filters 206a, 206b and 206c. Each of the red, green and blue color filters 206a, 206b and 206c is disposed in the pixel region P. A common electrode 208 is formed over the color filter layer 206 and the black matrix 204.

A light emitting diode 300 is disposed under the LCD panel LP and a diffusion plate 301 is disposed between the light emitting diode 300 and the LCD panel LP. Specifically, the diffusion plate 301 includes a first diffusion plate 302 over the light emitting diode 300 and a second diffusion plate 304 over the first diffusion plate 302.

Although not shown, first and second gate integrated circuit boards are disposed at first and second areas in a periphery with an active area, respectively. First and second data integrated circuit boards may be disposed at third and fourth areas crossing the first and second areas in a periphery with an active area, respectively. The LCD device is independently driven by each of the first to fourth areas.

It is noted that the black matrix 204 includes a first portion overlapping the gate line 104 and the data line 116 and a second portion overlapping the thin film transistors T and a part integral with the first portion that renders the black matrix 204 symmetrical with respect to the central gate line 104a. In other words, a formation portion of the black matrix 204 has a uniform size with respect to whole area of the LCD panel LP and is not depended on a formation position of the thin film transistor T.

Figure 5:
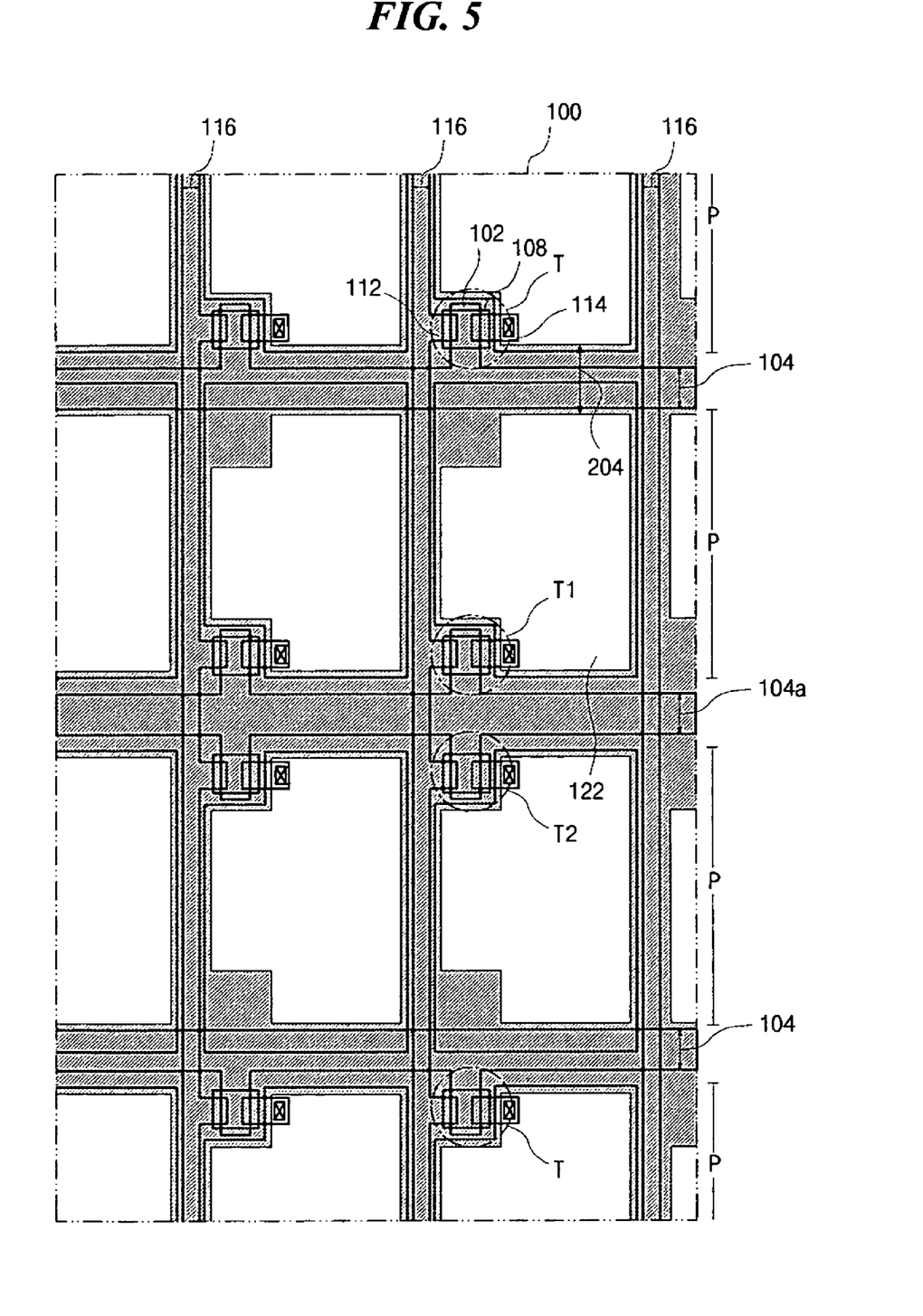
FIG. 5 is a schematic plan view of a FSC type LCD panel applying a tiling driving method according to the present invention.

FIG. 5 is a schematic plan view of a FSC type LCD panel applying to a tiling driving method according to the present invention.

As shown in FIG. 5, a plurality of gate lines 104 and 104a and a plurality of data lines 116 cross the plurality of gate lines 104 to define a plurality of pixel regions P on a first substrate 100. For example, the first substrate 100 includes a transparent insulating material. A plurality of thin film transistors T, T1 and T2 are formed at crossing points of the plurality of gate lines 104 and 104a and the plurality of data lines 116 and are symmetrically formed with respect to a central gate line 104a of the plurality of gate lines 104 and 104a. Each of the plurality of thin film transistors T, T1 and T2 includes a gate electrode 102, a semiconductor layer 108, a source electrode 112 and a drain electrode 114.

More specifically, first and second thin film transistors T1 and T2 of the plurality of thin film transistors T, T1 and T2 adjacent to the central gate line 104a are connected to the central gate line 104a. A plurality of pixel electrodes 122 are connected to the plurality of thin film transistors T, T1 and T2, each of the plurality of pixel electrodes 122 is formed in each of the pixel regions P.

Scanning signals are sequentially applied to two groups of the plurality of gate lines 104 and 104a with respect to the central gate line 104a.

A black matrix 204 overlaps the plurality of gate lines 104 and 104a and the plurality of data lines 116 including an interval between the plurality of pixel electrodes 122 and the plurality of gate and data lines 104, 104a and 116 to shield leakage light from the backlight unit (not shown). In addition, the black matrix 204 overlaps the plurality of thin film transistors T, T1 and T2 to prevent a leakage current that causes mis-driving.

More specifically, the black matrix 204 includes a first portion overlapping the plurality of gate lines 104 and the plurality of data lines 116 and a second portion overlapping the plurality of thin film transistors T and a part AP that is integral with the first portion and renders the black matrix 204 symmetrical with respect to the plurality of thin film transistors T, and with respect to the plurality of the gate lines 104 and the central gate line 104a.

Because the black matrix 204 is formed as a uniform structure that does not depend on the position of the plurality of thin film transistors T, T1 and T2, the moiré phenomenon caused by the visibility of the central gate line 104a is solved, thereby providing an LCD device having high image quality.

Here, the black matrix 204 may be formed on the first substrate 100 or a second substrate (not shown) facing the first substrate 100.

FIGS. 6A to 6F are schematic plan views in accordance with a fabricating process of an LCD device according to the present invention.

FIGS. 7A to 7F are schematic cross sectional views taken along lines VII-VII of FIGS. 6A to 6F, respectively.

Figure 6A:
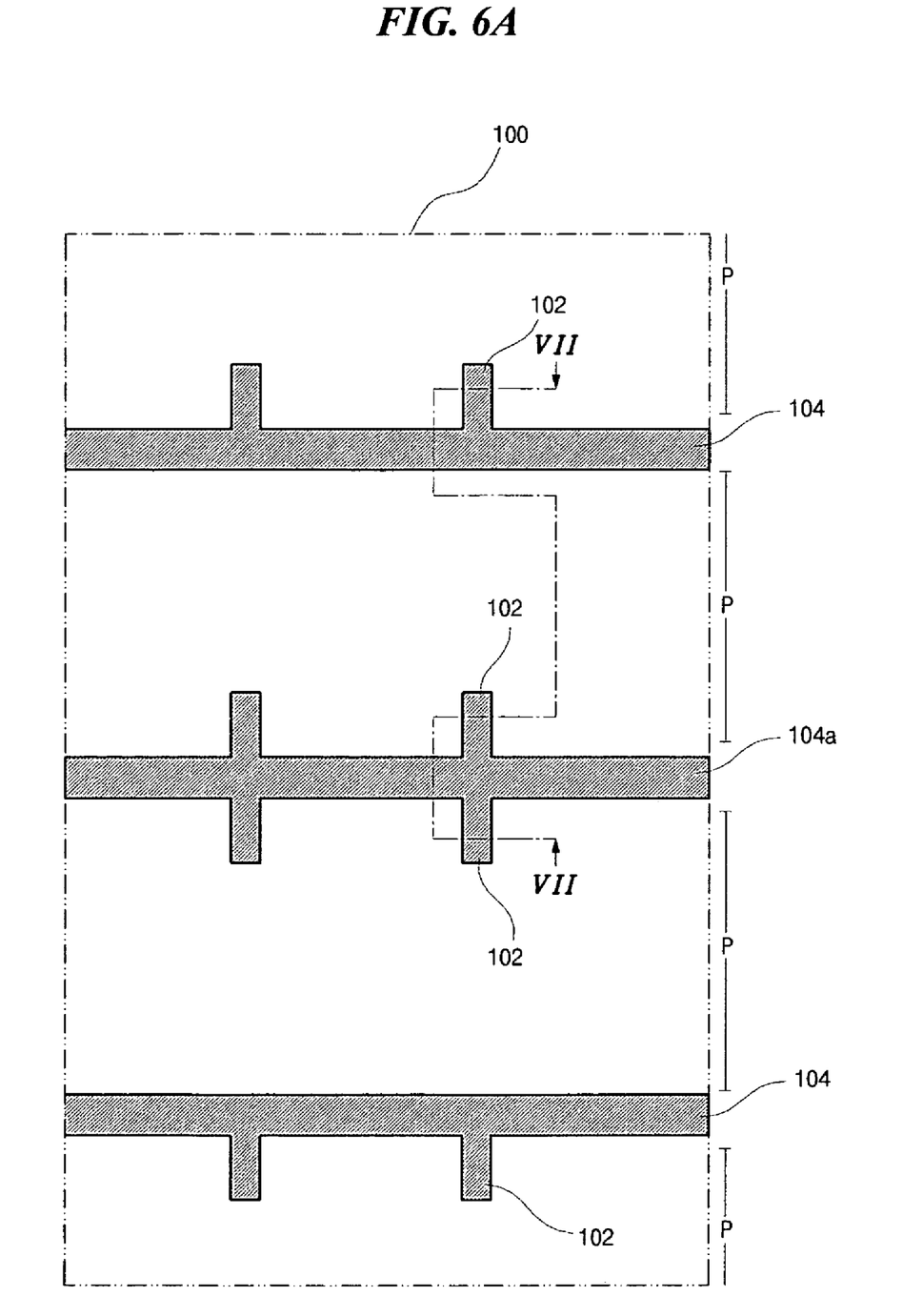
FIGS. 6A to 6F are schematic plan views in accordance with a fabricating process of an LCD device according to the present invention.
Figure 7A:
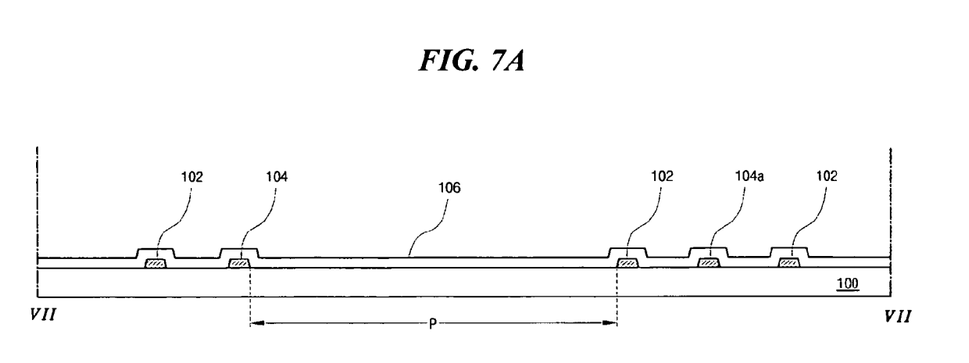
FIGS. 7A to 7F are schematic cross sectional views taken along lines VII-VII of FIGS. 6A to 6F, respectively.

In FIGS. 6A and 7A, a plurality of gate lines 104 and 104a and a plurality of gate electrodes 102 connected to the plurality of gate lines 104 and 104a are formed by depositing and patterning a conductive metallic material such as aluminum (Al), Al alloy, chromium (Cr), molybdenum (Mo), tungsten (W), and titan (Ti) on a first substrate 100 having a plurality of pixel regions P. Each of the plurality of gate electrodes 102 is disposed in each of the plurality of pixel regions P. Since the plurality of gate electrodes 102 are symmetrically formed with respect to the central gate line 104a of the plurality of gate lines 104 and 104a, the central gate line 104a has two gate electrodes 102 oriented in opposite directions toward each of the plurality of pixel regions P.

Further, a gate insulating layer 106 is formed by depositing an inorganic insulating material such as silicon nitride and silicon oxide on an entire surface of the first substrate 100.

Figure 6B:
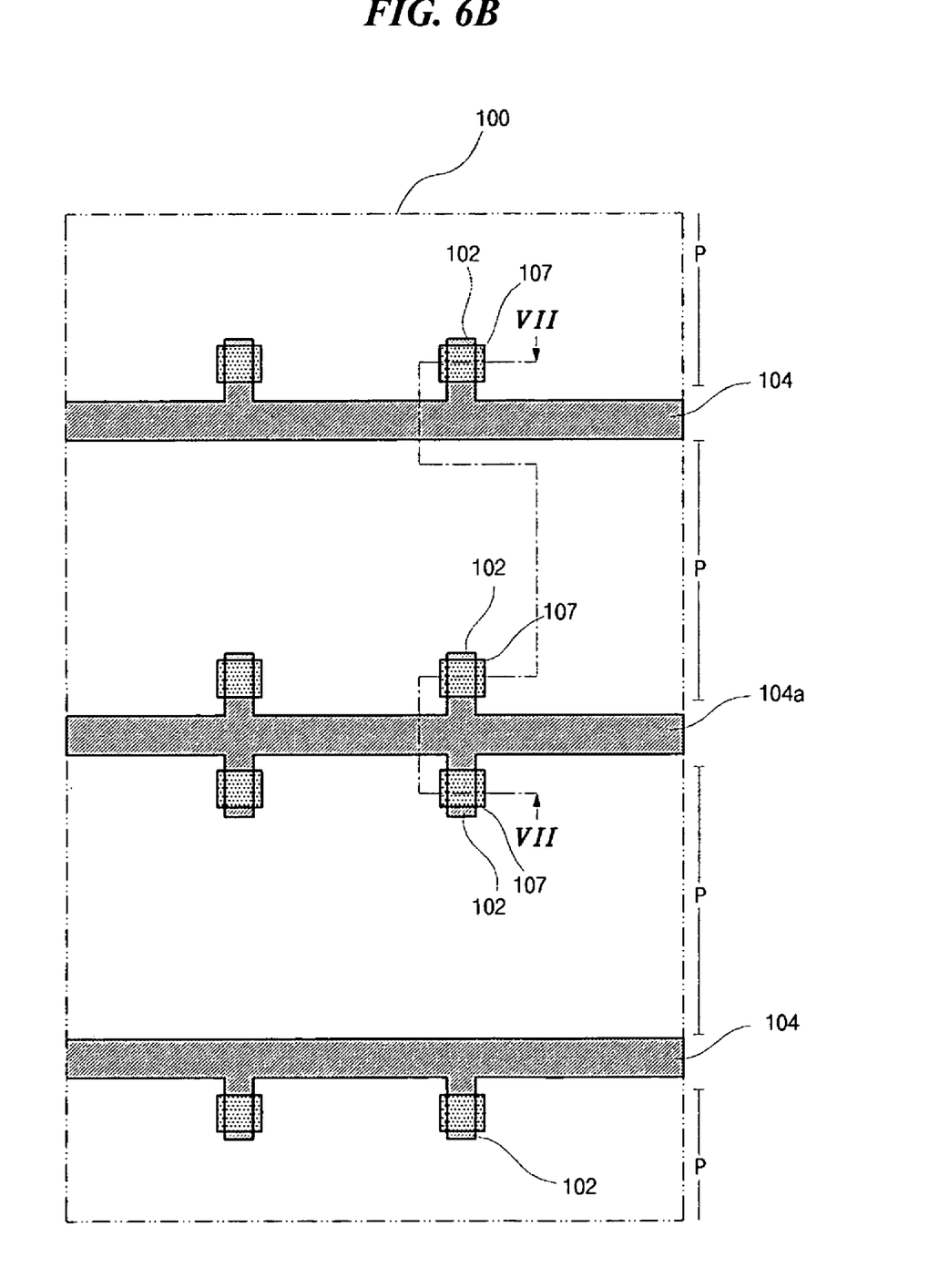
Figure 7B:
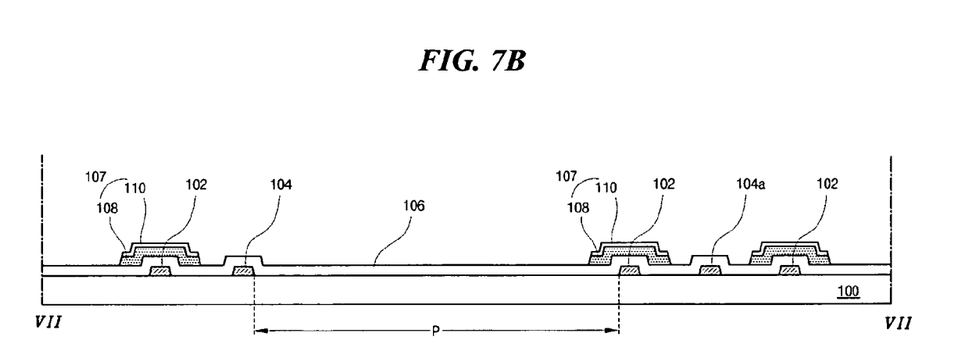

In FIGS. 6B and 7B, a semiconductor layer 107 having an active layer 108 and an ohmic contact layer 110 is formed by sequentially depositing an intrinsic amorphous silicon layer and a doped amorphous silicon layer on the gate insulating layer 106 over the plurality of gate electrodes 102.

Figure 6C:
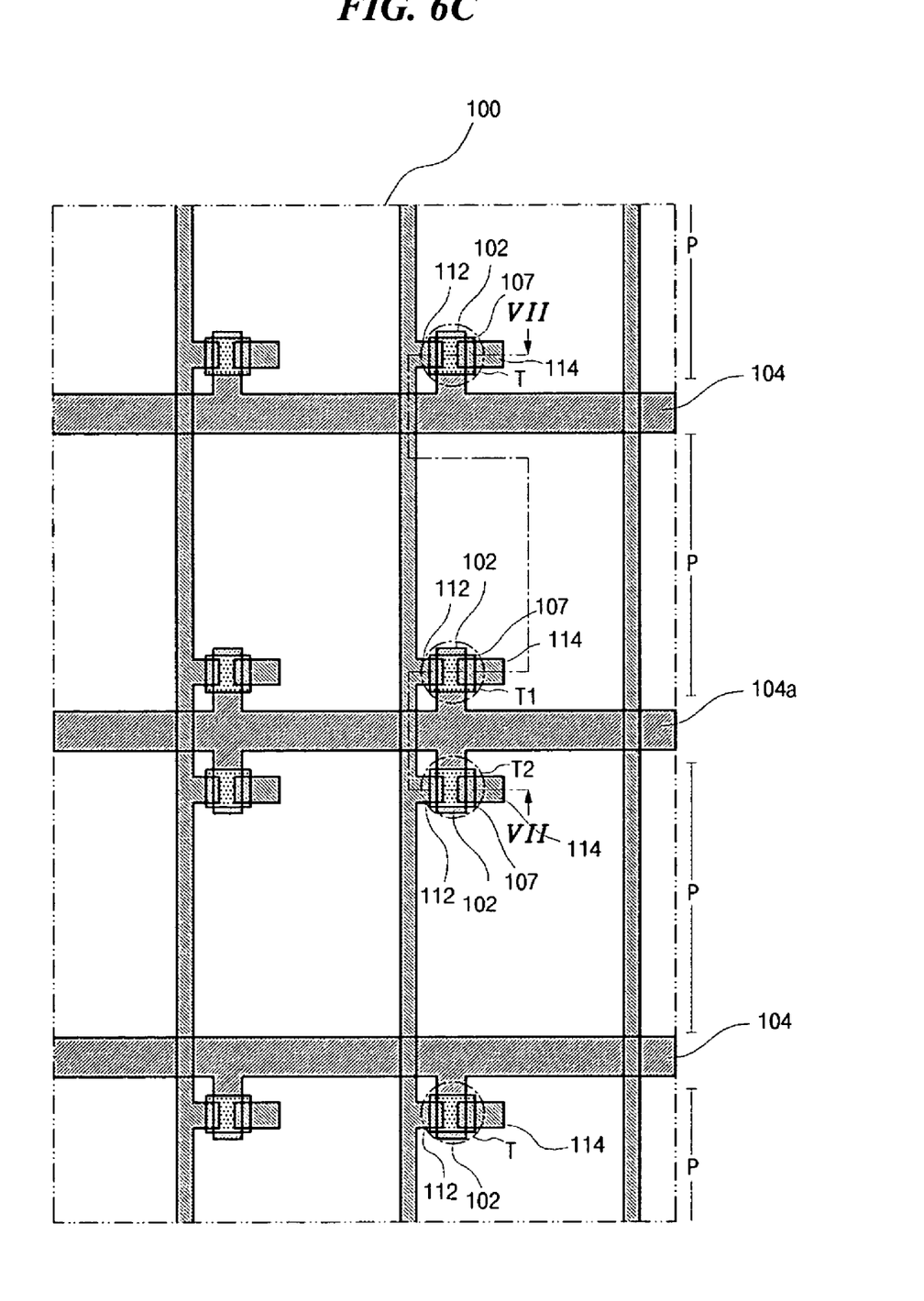
Figure 7C:
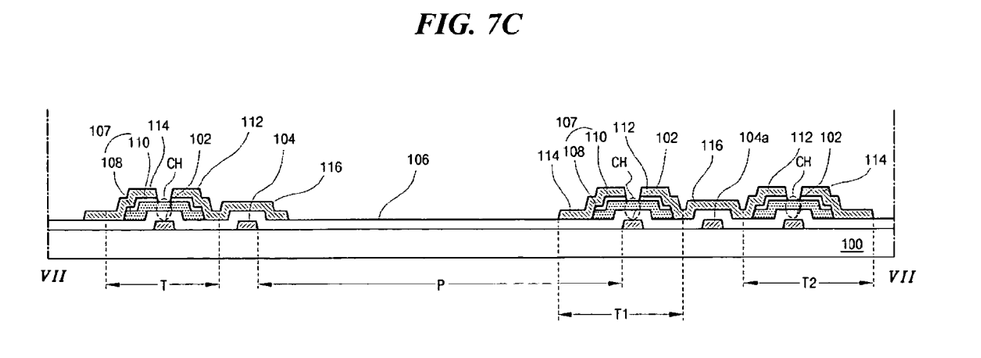

In FIGS. 6C and 7C, a plurality of data lines 116 cross the plurality of gate lines 104, a plurality of source electrodes 112 connect to the plurality of data lines 116. A plurality of drain electrodes 114, spaced apart from the plurality of source electrodes 112, are formed by depositing and patterning a conductive metallic material such as Al, Al alloy, Cr, Mo, W, Ti and copper (Cu) over the semiconductor layer 107. Each of the plurality of gate electrodes 102, the plurality of source electrodes 112 and the plurality of drain electrodes 114 constitutes each of a plurality of thin film transistors T. First and second thin film transistors T1 and T2 adjacent to the central gate line 104a are connected to the central gate line 104a.

Next, a first portion of the active layer 108 between the source electrode 112 and the drain electrode 114 is exposed by removing a second portion of the ohmic contact layer 110 corresponding to the first portion of the active layer 108. The exposed portion of the active layer 108 is defined as a channel CH.

Figure 6D:
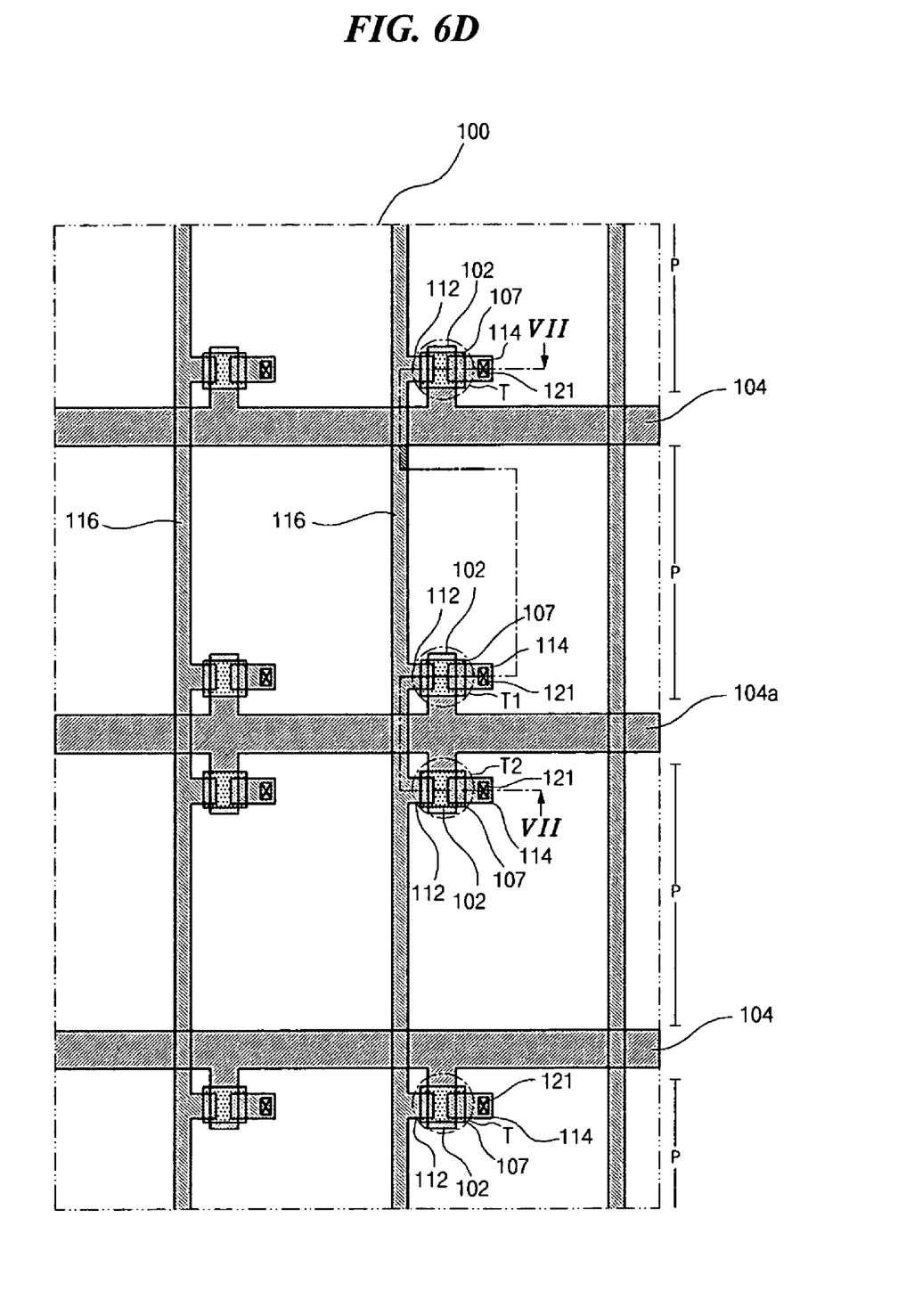
Figure 7D:
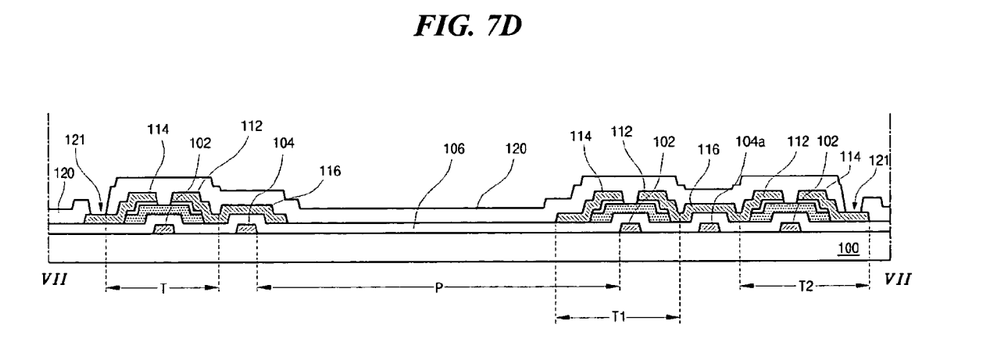

In FIGS. 6D and 7D, a passivation layer 120 is formed by depositing an inorganic insulating material and coating an organic insulating material, such as a benzocyclobutene (BCB) and an acrylic resin, over the plurality of thin film transistors T. Next, a drain contact hole 121 is formed to expose a portion of the drain electrode 114 in the passivation layer 120.

Figure 6E:
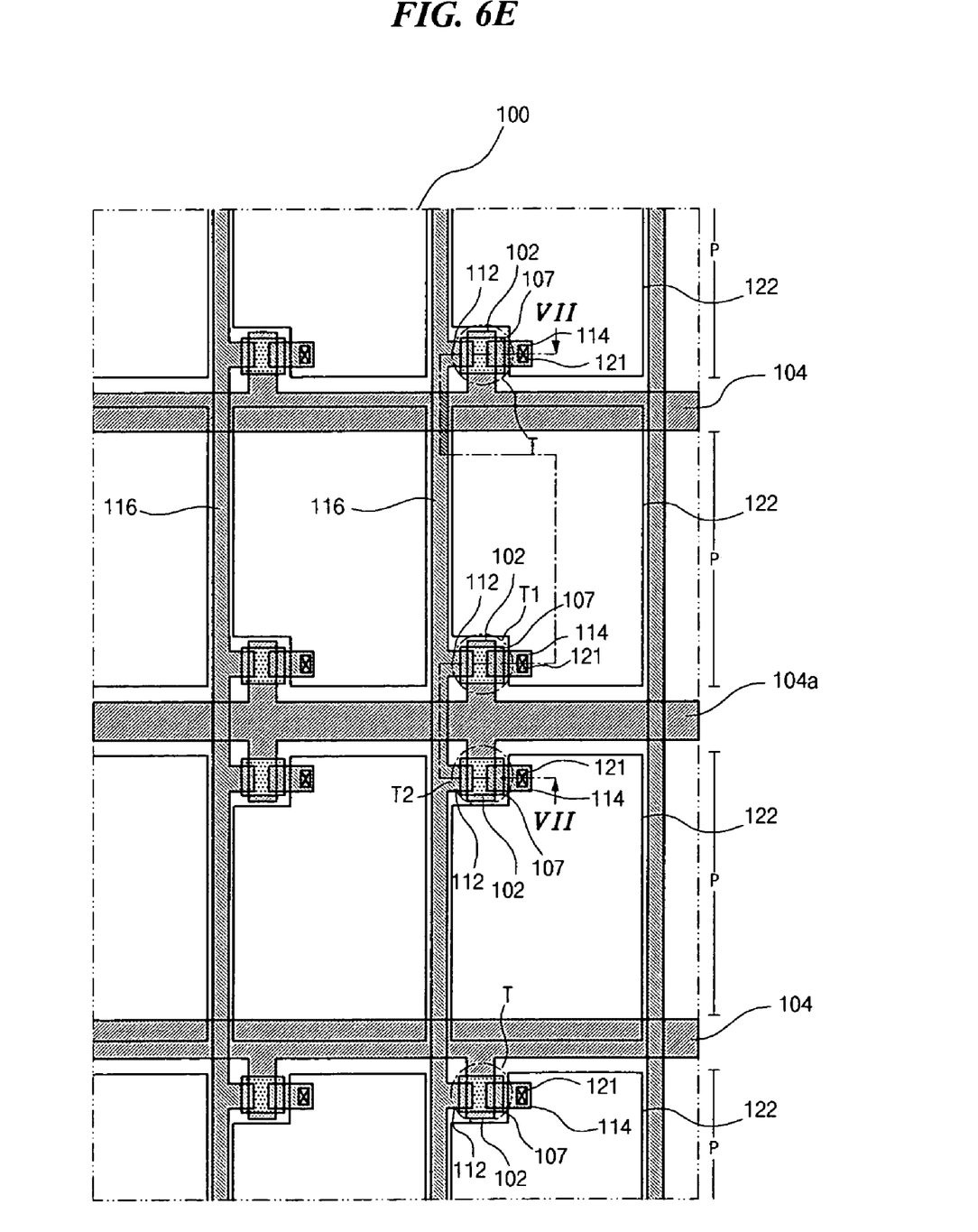
Figure 7E:
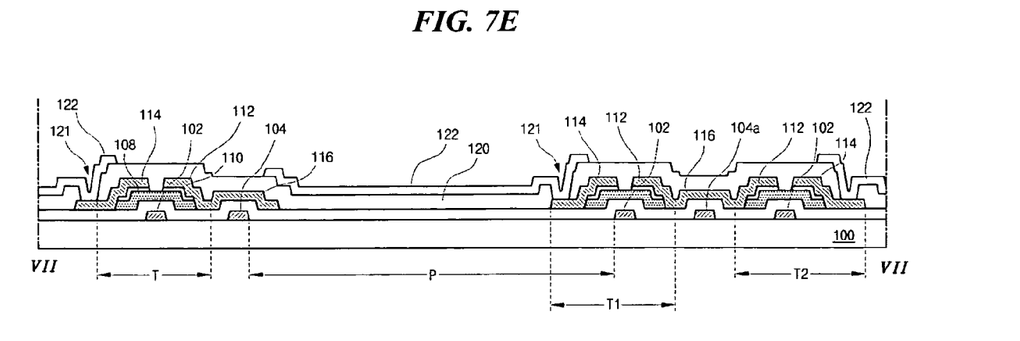

In FIGS. 6E and 7E, a plurality of pixel electrodes 122 are formed by depositing a transparent conductive material such as indium tin oxide (ITO) and indium zinc oxide (IZO) on the passivation layer 120 in the plurality of pixel regions P. Each of the plurality of pixel electrodes 122 are connected to the each of the plurality of drain electrodes 114 through each of the plurality of drain contact holes 121.

Figure 6F:
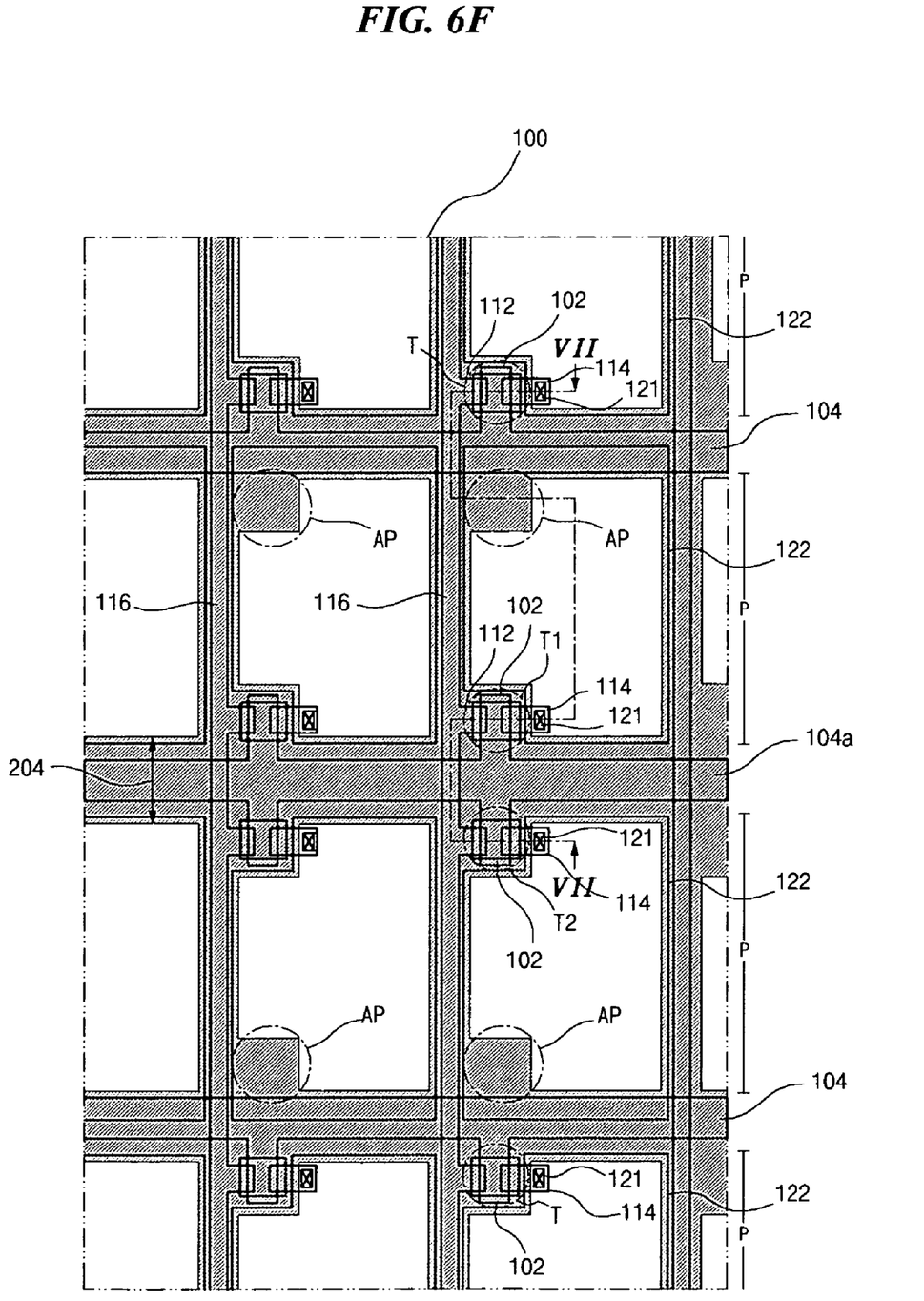
Figure 7F:
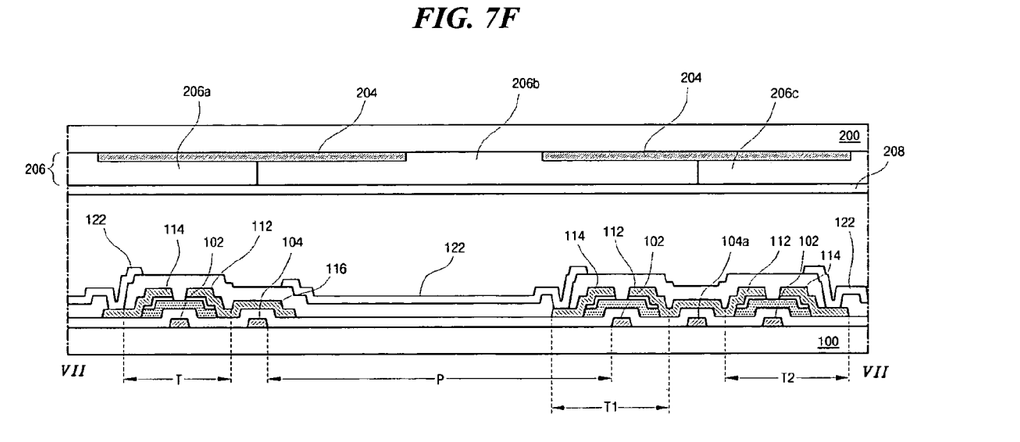

In FIGS. 6F and 7F, a black matrix 204 is formed over the plurality of thin film transistors T, T1 and T2 and includes a first portion overlapping the plurality of gate lines 104 and 104a and the plurality of data lines 116, a second portion corresponding the plurality of thin film transistors T, T1 and T2, and a part AP that is integral with the first portion and renders the black matrix 204 symmetric with respect to the plurality of thin film transistors T and with respect to the plurality of the gate lines 104 and the central gate line 104a.

As shown in FIG. 7F, the black matrix 204 may be formed on a second substrate 200 facing the first substrate 100. In this case, the black matrix 204 having the first and second portions is formed on an inner surface of the second substrate 200. A color filter layer 206 is formed on the black matrix 204 and includes red, green and blue color filters 206a, 206b and 206c, respectively, formed in accordance with the plurality of pixel regions P.

Next, a common electrode 208 is formed over an entire surface of the second substrate 200 having the black matrix 204 and the color filter layer 206.

However, the black matrix 204 may be formed on the first substrate 100 having the plurality of gate lines 104, the plurality of data lines 116, and the plurality of thin film transistors T.

The black matrix 204 according to the present invention includes a first portion overlapping the plurality of gate lines and the plurality of data lines, a second portion corresponding the plurality of thin film transistors T, T1 and T2, and a part AP that is integral with the first portion and renders the black matrix 204 symmetrical with respect to the plurality of thin film transistors T and with respect to the plurality of the gate lines 104 and the central ate line 104a, thereby improving image quality preventing a moiré phenomenon and image defects caused by the visibility of the central gate line 104a.

It will be apparent to those skilled in the art that various modifications and variations can be made in the liquid crystal display devices of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   a plurality of gate lines and a plurality of data lines crossing the plurality of gate lines to define a plurality of pixel regions on a first substrate;
   a plurality of thin film transistors at crossing points of the plurality of gate lines and the plurality of data lines, wherein the plurality of thin film transistors are symmetrically formed with respect to a central gate line of the plurality of gate lines, and wherein two groups of the plurality of thin film transistors are adjacent to the central gate line and are connected to the central gate line;
   a plurality of pixel electrodes connected to the plurality of thin film transistors, each of the plurality of pixel electrodes residing in each of the pixel regions; and
   a black matrix including a first portion overlapping the plurality of thin film transistors, and a part that is integral with the first portion and renders the black matrix symmetrical with respect to the plurality of gate lines.

2. The device according to claim 1, further comprising a second substrate facing the first substrate and the plurality of pixel regions, wherein the black matrix resides on the second substrate.

3. The device according to claim 2, further comprising red, green and blue color filters on the second substrate, wherein each of the pixel regions is associated with a red color filter, a green color filter, and a blue color filter.

4. The device according to claim 3, wherein the liquid crystal display device comprises a field sequential color type device, such that the red, green, and blue color filters are sequentially driven with a time interval.

5. The device according to claim 4, wherein the liquid crystal display device is driven by a tiling driving method, such that partitioned portions of a liquid crystal panel are independently driven.

6. The device according to claim 5, further comprising a backlight unit under the first substrate.

7. The device according to claim 6, wherein the backlight unit comprises a light emitting diode emitting red, green and blue colors.

8. The device according to claim 5, wherein the first substrate includes a first area having the plurality of pixel regions and a second area in a periphery of the first area, wherein first and second gate integrated circuits reside in a first portion of the second area, and first and second data integrated circuits reside in a second portion of the second area that crosses the first portion.

9. The device according to claim 1, wherein each of the plurality of thin film transistors includes a gate electrode connected to a gate line, a semiconductor layer over the gate electrode, a source electrode connected to a data line, and a drain electrode spaced apart from the source electrode.

10. The device according to claim 1, wherein a portion of the plurality of thin film transistors include first and second gate electrodes symmetrically diverged from the central gate line, first and second source and drain electrodes associated with the first and second gate electrodes that constitute first and second thin film transistors of the plurality of thin film transistors.

11. The device according to claim 1, wherein the black matrix further comprises a second portion overlapping the plurality of gate lines and the plurality of data lines.

12. A method of fabricating a liquid crystal display device, comprising:
    forming a plurality of gate lines having a plurality of gate electrodes on a first substrate, wherein the first substrate has a plurality of pixel regions, wherein each of the plurality of gate electrodes are formed in each of the plurality of pixel regions, wherein two groups of the plurality of gate electrodes are adjacent to and directly connected to the central gate line;
    forming a plurality of data lines crossing the plurality of gate lines;
    forming a plurality of source electrodes connected to the plurality of data lines and a plurality of drain electrodes spaced apart from the plurality of source electrodes, wherein each of the plurality of gate electrodes, the plurality of source electrodes and the plurality of drain electrodes constitutes one of a plurality of thin film transistors, and wherein two groups of the plurality of thin film transistors adjacent to the central gate line are connected to the central gate line;
    forming a plurality of pixel electrodes connected to the plurality of thin film transistors, each of the plurality of pixel electrodes connected to the each of the plurality of drain electrodes; and
    forming a black matrix including a first portion corresponding the plurality of thin film transistors, wherein a part is integral with the first portion and renders the black matrix symmetrical with respect to the plurality of the gate lines.

13. The method according to claim 12, further comprising a step of forming a plurality of semiconductor layers between the plurality of gate electrodes and the plurality of source and drain electrodes.

14. The method according to claim 12, further comprising a step of forming a color filter layer on a second substrate corresponding to the plurality of pixel regions when facing the first substrate, wherein the black matrix is formed on the second substrate.

15. The method of claim 12 further comprising forming a second portion overlapping the plurality of gate lines and the plurality of data line.

16. A liquid crystal display device, comprising:
    a plurality of gate lines and a plurality of data lines crossing the plurality of gate lines that define a plurality of pixel regions on a first substrate;
    a plurality of thin film transistors each residing in a pixel region, wherein the plurality of thin film transistors are symmetrically formed with respect to a central gate line and wherein paired transistors reside on opposite sides of the central gate line; and
    a black matrix including a first portion overlying the central gate line and the paired transistors, a second portion overlying the plurality of thin film transistors, and an additional part that is integral with the second portion and renders the black matrix symmetrical with respect to the first portion.

17. The device according to claim 16 wherein the additional part of the black matrix resides on a side of each gate line opposite from a thin film transistor and extends into an adjacent pixel region.

18. The device according to claim 17 wherein the adjacent pixel region underlying the additional part is substantially unpopulated by transistors.

19. The device according to claim 18 further comprising a plurality of pixel electrodes connected to the plurality of thin film transistors, each of the plurality of pixel electrodes residing in each of the pixel regions.

20. The device according to claim 16, further comprising a backlight unit under the first substrate, wherein the backlight unit includes a light emitting diode emitting red, green and blue colors.

21. A liquid crystal display device, comprising:
    a central gate line having paired transistors residing on opposite sides of the central gate line;
    first and second gate lines residing on either side of the central gate line, each gate line having unpaired transistors; and
    a black matrix including a first portion overlying the central gate line and the paired transistors, a second portion overlying the unpaired transistors, and a part opposite the unpaired transistors that is integral with the second portion and renders the black matrix symmetrical with respect to the central gate line.

* * * * *